March 31, 1953 — H. H. ENGEMANN — 2,633,112
AUTOMATIC TAPPET
Filed June 22, 1950 — 2 SHEETS—SHEET 1
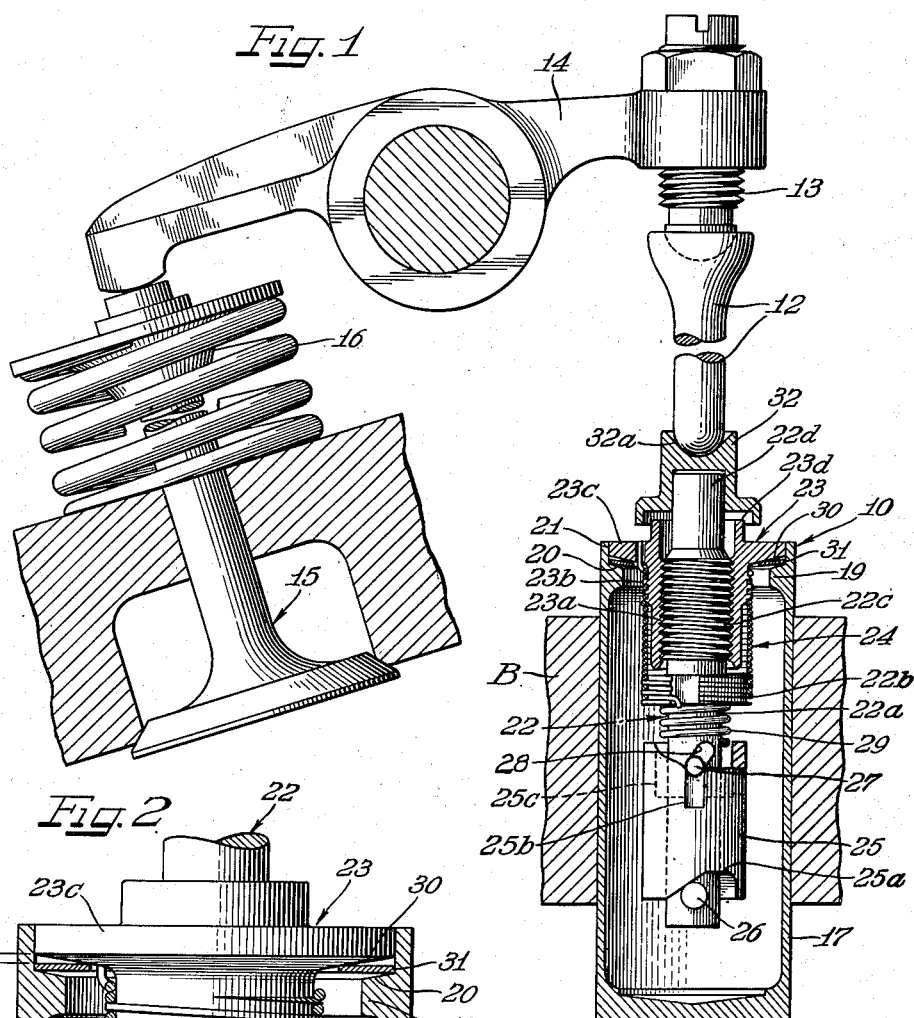
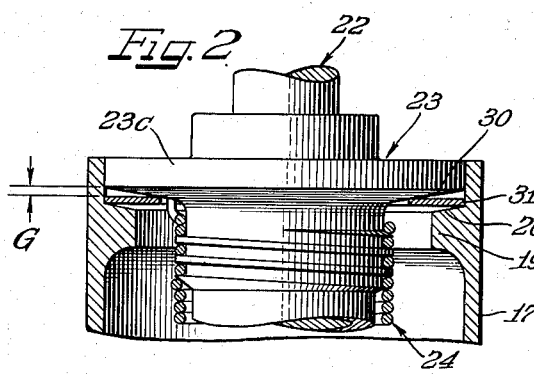
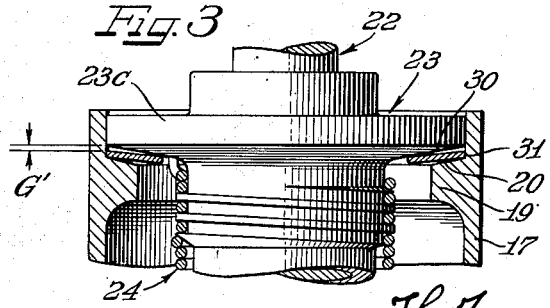
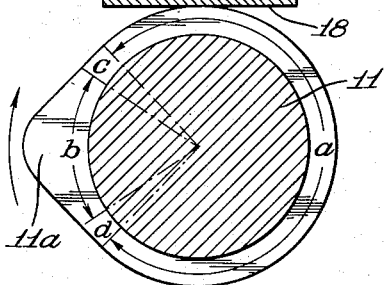
Inventor
Herbert H. Engemann
by The Firm of Charles W. Hill
Attys March 31, 1953   H. H. ENGEMANN   2,633,112
AUTOMATIC TAPPET
Filed June 22, 1950   2 SHEETS—SHEET 2
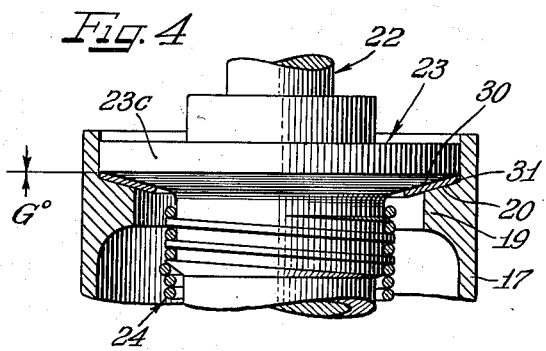
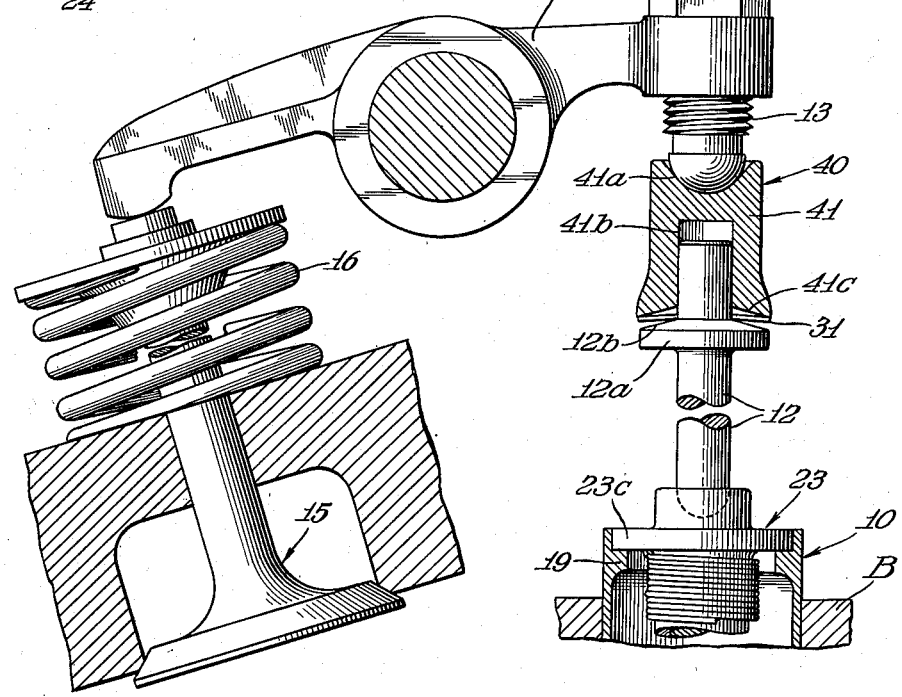
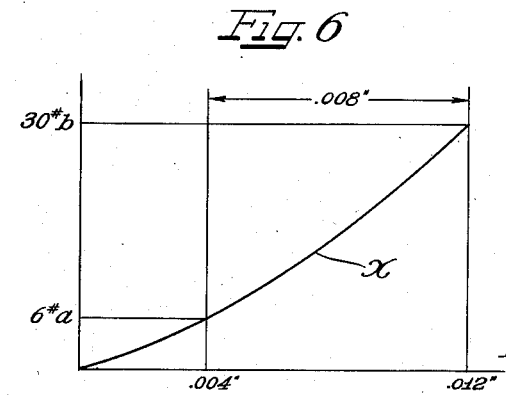
Inventor
Herbert H. Engemann
by The Firm of Charles W. Hill   Attys Patented Mar. 31, 1953

2,633,112

UNITED STATES PATENT OFFICE 2,633,112

AUTOMATIC TAPPET

Herbert H. Engemann, Cleveland Heights, Ohio, assignor to Thompson Products, Inc., Cleveland, Ohio, a corporation of Ohio Application June 22, 1950, Serial No. 169,543

1 Claim. (Cl. 123—90)

This invention relates to clearance regulators or lash adjusters having constant clearance controls which will absorb irregularities to prevent over-control by the regulators or adjusters.

Specifically, this invention deals with valve linkages having automatic clearance regulators wherein a load transmitting bi-symmetrical deflectable member is included in the linkage to maintain a constant clearance.

Automatic clearance regulators or lash adjusters inherently take up looseness or play by maintaining a load on extensible parts under all conditions of operation, so that any irregularities in the operating mechanism will cause the regulator or adjuster to function thereby producing an undesired tightness in the linkage and frequently preventing full seating of the linkage operated parts such as valves or the like. In other words, the clearance regulator cannot distinguish looseness or play due to cam irregularities from looseness or play due to thermal expansion.

The present invention now provides a safety device which preserves a predetermined or constant clearance in a linkage including a clearance regulator, thereby insuring proper operation of parts such as valves actuated by the linkage. This safety device includes a flat spring washer transmitting spring load between its outer and inner peripheries for preventing looseness in the linkage but capable of being deflected under increased loads to transfer such loads as a solid unyielding member. The spring washer is bi-symmetrical (i. e. can be used in reversed positions with the same results), is easily assembled, and is inexpensive.

It is, then, an object of this invention to provide a safety device in a linkage including an automatic clearance regulator for creating a predetermined or constant operating clearance in the linkage without permitting looseness or play to develop in the linkage.

Another object of the invention is to provide a one-piece bi-symmetrical safety device requiring no manual adjustment for maintaining a predetermined or constant valve operating clearance in a valve linkage having an automatic clearance regulator.

A further object of the invention is to permit the use of an automatic valve clearance regulator in a valve linkage actuated by a cam shaft designed to create specified valve operating clearance.

A further object of the invention is to provide a spacing device which does not depend on specified seating surfaces which in production might vary considerably.

Another object of the invention is to provide a bi-symmetrical constant clearance regulator coacting with inclined seating surfaces which only control the operating limits of the device.

Other and further objects of the invention will be apparent to those skilled in the art from the following detailed description of the annexed sheets of drawings which, by way of preferred examples only, illustrate several embodiments of the invention.

As shown on the drawings:

Figure 1 is an elevational view, with parts in vertical cross section, of a valve linkage having a mechanical type of automatic valve clearance regulator including the spacing device of this invention;

Figure 2 is an enlarged fragmentary cross-sectional view, with parts in elevation, showing the spacing device of this invention on a larger scale and in an unloaded condition;

Figure 3 is a view similar to Figure 2 but illustrating the spacing device in partially loaded condition;

Figure 4 is a view similar to Figure 2 but illustrating the spacing device in fully deflected condition;

Figure 5 is an elevational view, with parts in vertical cross section, diagrammatically illustrating the spacing device of this invention incorporated in a valve linkage outside of the automatic valve clearance regulator but working in conjunction with the regulator.

Figure 6 is a typical load-deflection chart of the spacing devices of this invention.

As shown on the drawings:

In Figure 1, the reference numeral 10 designates generally a mechanical type of automatic valve tappet slidably mounted in an engine block B and actuated by a cam shaft 11. The tappet, in turn, actuates a push rod 12 which transmits reciprocating motion to an adjusting screw 13 in the end of a rocker arm 14 which opens a poppet valve 15 against the load of a valve spring 16.

The cam shaft 11 has the major portion of its circumference, designated by the angle $a$, constituting a base circle having no valve opening effect on the valve linkage. A cam lobe 11a on the cam shaft is effective to actuate the linkage for opening the valve and this lobe has an angular displacement designated at $b$. As the base circle approaches and leaves the cam lobe 11a, deflection take up and releasing areas known as opening and closing ramps, are provided on the leading and trailing ends of the cam lobe and extend over an angular area designated at c and d respectively.

The tappet 10 includes a cylindrical body cup 17 with a flat bottom 18 riding on the cam shaft. The top end of the cup 17 has an integral thickened annular rib 19 providing an inclined shoulder 20 in spaced relation inwardly from the open top of the cup. A cylindrical rim wall 21 projects outwardly from the outer periphery of this shoulder 20.

The automatic tappet 10 includes a stud or screw element 22 and a nut element 23 in free threaded engagement on the screw, together with a torsion spring 24 having one end anchored in the screw and the other end anchored in the nut for urging the threaded together parts in an unscrewing direction to increase their effective length.

The screw 22 includes a cylindrical shank 22a, an intermediate helically grooved head 22b, a threaded portion 22c above the head, and a second cylindrical shank 22d above the threaded portion and projecting out of the upper end of the cup 17.

The nut 23 includes a hollow internally threaded cylindrical portion 23a with a helically grooved localized area 23b, an outturned disk flange 23c fitting freely in the cylindrical lip 21 of the cup, and a recessed cylindrical rim 23d projecting above the central portion of the flange 23c.

The lower end portion of the torsion spring 24 has several turns thereof seated in the grooves of the grooved head portion 22b of the screw and has the lower end thereof anchored in a recess in the screw. The upper end portion of the torsion spring has several turns thereof seated in the grooved portion 23b of the nut and has the upper end thereof anchored in a hole in the disk portion 23c of the nut. After the nut is threaded on the stud, the torsion spring will be wound up tending to rotatively drive the stud to take up slack in the valve linkage.

The shank 22a of the screw slidably guides an inertia hammer sleeve 25 with a helical cam shaped recess 25a in the bottom thereof and an axially grooved recess 25b extending inwardly from the top thereof. A pin 26 on the shank 22a fits in the recess 25a. The pin 26 is firmly anchored in the shank 22a.

A second pin 27 projects into the slot 25b and through a helical opening 28 in the shank 22a.

The upper end of the sleeve 25 is recessed at 25c to a depth beyond the lower end of the opening 28 and a coil spring 29 on the shank 22a has one end thereof bottomed against the head 22b and has the other end thereof projecting into the recess 25c and bottomed on the pin 27.

The inertia hammer sleeve is effective for shortening the over all length of the screw and nut assembly under the influence of inertia forces produced by the acceleration and deceleration of the tappet 10 such as occur during the normal cycle of operation of the valve linkage. In each such cycle of operation, the sleeve 25 will be axially displaced upwardly with respect to the screw 22 and will then be displaced downwardly. Throughout the major portion of both of these movements, the inertia sleeve is resiliently confined to movement along an axial path by the pin 27 and axial slot 25b receiving this pin.

When the sleeve 25 is displaced upwardly, only axial movement will occur until the bottom of the slot contacts the pin 27 thereby causing the pin to rise in its slot 28 and due to the helical contour of this slot, a rotative and vertically upward movement will take place of the hammer sleeve 25. The rotative movement of sleeve 25 has no particular function during this upward movement of sleeve 25, but the axial component of the impact force of the sleeve is cushioned by the spring 29.

When the sleeve 25 shifts downward on the screw 22, it again follows a substantially axial path throughout the major portion of its movement until the helical portion of the recess 25a strikes the pin 26 and exerts a rotating force on the screw in a direction tending to thread the screw further into the nut. Further, this downward impact produces a torsional reaction force on the sleeve 25 itself, which tends to angularly twist the guide pin, and, since any angular movement of this guide pin is confined by the slot 28 to movement along a helical path, the spring 29 will be compressed to also cushion the impact of the sleeve upon the pin 26.

It should therefore be understood that the torsion spring 24 tends to elongate the valve linkage between the cam shaft 11 and the rocker arm screw 13, while the inertia sleeve 25 tends to shorten this linkage.

In accordance with this invention, the bottom face of the disk flange 23c on the nut 23 is provided with an upwardly sloping face 30 and a flat by-symmetrical spring washer 31 is positioned between this sloping face and the sloping shoulder 20 of the rib 19. This spring provides the constant clearance feature of this invention.

A cap member 32 is seated on the shank end 22d of the screw and has a rounded recess 32a receiving the lower end of the push rod 12.

In operation, the cam lobe 11a lifts the cup 17 to first seat the washer 31 on the shoulder 20 and to then raise the nut 23. The nut, in turn, lifts the screw 22 which, of course, raises the cap 32 to lift the push rod and rocker arm screw 13. The rocker arm then opens the valve 15 against the load of the spring 16. During that part of the opening and closing stroke at which the tappet is subjected to deceleration, the inertia sleeve will rise toward the head 22b. But during the last part of the closing stroke when the tappet is subjected to acceleration, this acceleration will cause the inertia sleeve to create an impact causing the linkage to decrease in length between the cam and rocker arm screw. Then near the end of the valve closing cycle, as the load of the valve spring 16 is removed from the linkage, the torsion spring 24 will be effective to elongate the linkage to reclaim any looseness. However, the elongation will continue as low spots on the base circle a of the cam shaft 11 ride over the bottom wall 18 of the cup or as irregularities in this bottom wall create looseness or play. Then, when the cam lobe 11a again approaches the bottom wall 18 on the next valve opening cycle, the linkage will be too long and the valve will start to open as the approaching ramp c rides on the tappet wall and, in exaggerated condition, the valve may even be partially cracked or opened while the tappet is still riding on higher spots in the base circle of the cam shaft.

This inadvertent opening of the valve or prevention of full valve seating is eliminated by the constant clearance regulator of this invention as illustrated in Figures 2 to 4.

In Figure 2, the spring washer 31 is in an unloaded condition and has its outer periphery seated on the outer end of the sloping shoulder 20 while its inner periphery is seated on the inner end of the sloping under face 31 of the disk flange 23c. While the slope angles of the shoulder and under face are illustrated as being the same, maintenance of such condition is not essential.

The slope of the shoulder 20 is designed as to give an operating gap G between the cup 17 and the nut 22.

In order to eliminate any looseness in the valve linkage, the torsion spring 24 of the clearance regulator is tensioned so that it will cause rotation of the screw 22 in the nut 23 to increase the effective length of the linkage and partially deflect the spring washer 31 to the position shown in Figure 2, thereby decreasing the gap from G to G' (Fig. 3). This will place a small load in the linkage which, however, is not sufficient to influence the action of the valve spring 16 in holding the valve in its fully closed or seated position.

When the cam lobe 11a actuates the tappet, the spring is completely deflected to a full seating position on the shoulder 20, thereby reducing the gap to zero as indicated at G⁰ in Figure 4. In this deflected position, the spring 31 becomes a rigid member transmitting motion without absorption between the cup 17 and the nut 23.

As the cam lobe passes off of the bottom 18 of the cup 17, the spring 31 will reclaim the position shown in Figure 3 to provide the gap G' in the linkage. This gap will be sufficient to accommodate irregularities due to run out conditions, low spots in the base circle, deflection of the cam shaft, and the like variations without permitting the clearance regulator to elongate the linkage but at the same time preventing looseness in the linkage.

In the modification shown in Figure 5, parts identical with parts described in connection with Figure 1 have been marked with the same reference numerals. As shown in Figure 5, the flange 23c of tappet nut 23 is seated directly on the thickened portion or rib 19 of the cup 17 and the push rod 12 acts on the adjusting screw 13 through the media of a separate constant clearance regulator 40. This regulator 40 includes a housing piece 41 with a rounded recess 41a in the upper wall thereof receiving the adjusting screw 13, a cylindrical recess 41b extending inwardly from the bottom wall thereof receiving the upper end of the push rod and a tapered or sloping bottom face 41c converging toward the recess 41b. The push rod has a collar 12a thereon with a sloping top face 12b parallel with the bottom face 41c of the housing. A flat spring washer 31 is disposed around the upper portion of the push rod and has its inner periphery seated on the collar face 12b while its outer periphery is seated on the outer end of the tapered bottom face 41c. The tapered faces provide an operating clearance gap and the washer 31 will deflect in the same manner as described above in connection with Figures 1 to 4 to maintain an initial light load in the assembly for preventing looseness and to provide a constant clearance in the linkage that will eliminate over-elongation of the clearance regulator 10.

The chart of Figure 6 illustrates a typical load deflection curve for the bi-symmetrical spacing device of this invention. As shown in Figure 6, deflection of the spacing device in inches is plotted against load on the spacing device in pounds. The curve $x$ shows that at a 6 pound load the spacing device will deflect .004 inch, while, at 30 pounds load, the deflection will be .012 inch. The spacing device will therefore have an operating range of .008 inch between the initial deflection shown in Figure 3 of the drawings and the complete or valve opening deflection shown in Figure 4 of the drawings. Of course, it should be understood that this chart is only an example of a typical installation and that the stiffness of the spring can be varied as desired to produce different load and deflection characteristics.

The safety device or constant clearance regulator of this invention is adapted for use in combination with any type of clearance regulator and the illustrated mechanical torsion spring loaded and inertia hammer operated tappet is only intended as an example of an operative device. The constant clearance regulator is also operative with hydraulic tappets and push rods as well as mechanical regulators of various types now known in the art.

It should therefore be understood that the invention provides a simple, inexpensive, bi-symmetrical constant clearance regulator for a linkage including an automatic lash adjuster or clearance adjusting device.

It will be understood that modifications and variations may be effected without departing from the scope of the novel concepts of the present invention.

I claim as my invention:

A valve clearance regulator comprising a housing cup having an open end with an adjacent internal sloping shoulder, said housing adapted to receive actuating forces to be transmitted by the valve clearance regulator, threaded together screw and nut elements in said cup, a torsion spring anchored on said elements tending to unscrew the same into an elongated condition, an inertia hammer on the screw parts acting to thread the elements together into a foreshortened position, said nut having a flange overlying said shoulder, and a bi-symmetrical spring washer disposed between said flange and said shoulder for transmitting load between the cup and nut and for deflecting to absorb some of the load without transmitting movement, whereby spurious forces acting on the housing cup are not transmitted to the torsion spring and intertia hammer.

HERBERT H. ENGEMANN.

REFERENCES CITED

The following references are of record in the file of this patent:

UNITED STATES PATENTS

| Number | Name | Date |
| --- | --- | --- |
| 2,066,976 | Holmes | Jan. 5, 1937 |
| 2,468,332 | Johnson | Apr. 26, 1947 |